June 23, 1964

A. J. MANNINO ETAL 3,137,887

BUSHING

Filed June 15, 1962

INVENTORS.
ANTHONY J. MANNINO
ELBERT L. WILCOX
BY

ATTORNEY.

United States Patent Office 3,137,887
Patented June 23, 1964

3,137,887
BUSHING
Anthony J. Mannino, Massapequa, and Elbert L. Wilcox, Merrick, N.Y., assignors to Republic Aviation Corporation, near Farmingdale, N.Y., a corporation of Delaware
Filed June 15, 1962, Ser. No. 202,732
3 Claims. (Cl. 16—2)

This invention relates to bushings and, more particularly, to a bushing for honeycomb panels for the accommodation of fastener means by which such panels are mounted or connected in structural assemblies.

Honeycomb has been and is used extensively as a filler or core in sandwich construction because of its good weight-to-strength characteristics. The honeycomb core, however, is limited to strength in compression, having substantially no strength in shear which is obtained in the panel assembly exclusively through the facing sheets. Therefore, much attention has been given to mounting attachments which pierce the honeycomb panel, lest the shear strength of the installed panel be unduly reduced.

To this end, various fastener bushings have been designed which pierce the honeycomb panel transversely, defining centrally the fastener passage, and terminate in one or both ends that abut the surfaces of the facing sheets. Some of these known structures are potted or fabricated into the honeycomb panel, occupying selected localized areas thereof. Others are adapted to be installed in the honeycomb panel subsequent to its fabrication and usually terminate at least at one end in a lateral flange which may be recessed or dimpled to permit countersinking of the fastener. Sometimes these prior art bushings are made slightly larger than the transverse dimension of the panel, thereby allowing for their compression when installed, causing an expansion thereof in the area of the honeycomb core to result in a secure fitting and greater strength of the ultimate assembly.

All of these prior bushings are objectionable for one or more reasons in structural applications of honeycomb panels. The prefabricated or potted construction places limitations on the location of mounting or connecting fasteners in the ultimate installation. At best, they merely provide a filler between the facing sheets in an attempt to insure the distribution of shear loads equally in the facing sheets.

Moreover, all of these prior constructions leave much to be desired in rendering a smooth and uninterrupted external surface on the ultimate honeycomb panel. Either a projecting flanged end is disposed outwardly of the panel's surface or where the oversized bushing is compressed the force required is greater than the honeycomb material will withstand, causing it to buckle, and an irregular transverse dimension of the sheet in the area of and adjacent to the bushing results.

The present invention proposes to overcome these as well as other shortcomings of the existing art by the provision of a fastener bushing capable of being readily installed in a honeycomb panel to produce a mounting attachment therefor having a precision flushness with the associated external surface. At the same time, the design of the instant bushing is such as to produce a larger and/or preformed bearing area on the facing sheets adjacent the fastener passage whereby maximum shear loads acting on the panel are transferred away from the honeycomb core and into the facing sheets.

In addition, the invention contemplates the prefabrication of bushings as proposed herein as individual units in a range of predetermined sizes, i.e., length and outside and inside diameters capable of installation in a honeycomb panel in any selected area thereof. Such installation may be readily made at the particular location of the panel, whether or not it forms a part of a larger or complete assembly.

With the above and other objects in view, as will be apparent, this invention consists in the construction, combination and arrangement of parts, all as hereinafter more fully described, claimed and illustrated in the accompanying drawings, wherein:

Figure 1:
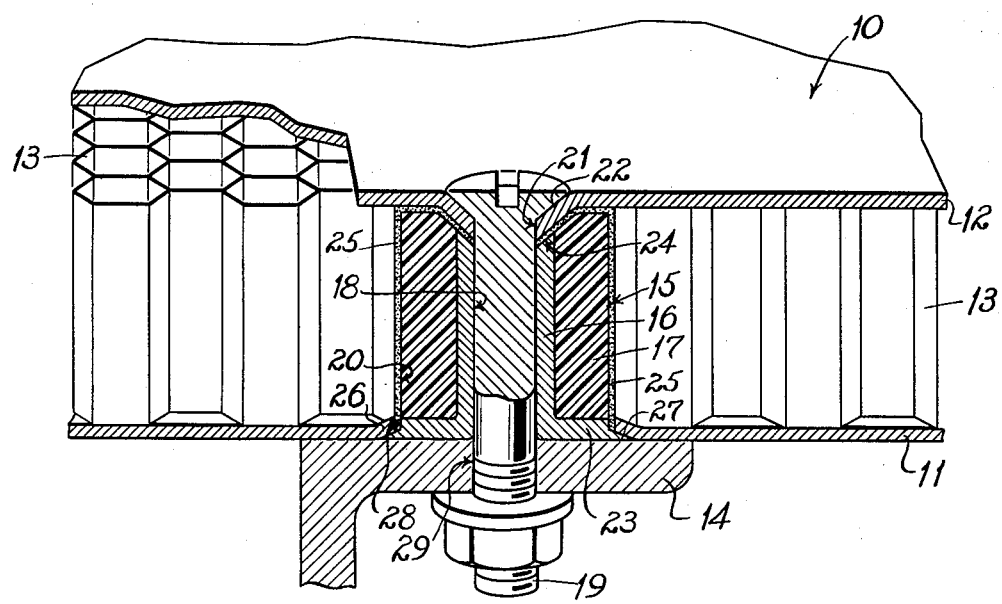
FIG. 1 is a section taken through the connection of a honeycomb panel to a mounting structure employing a bushing constructed in accordance with the teachings of the invention, only a fragment of the panel and mounting structure being shown in perspective.
Figure 2:
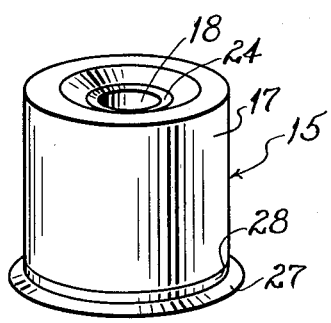
FIG. 2 is a perspective view of the bushing illustrated in FIG. 1 to show it as a unitary element adapted to be prefabricated in a range of predetermined sizes for insertion or installation in honeycomb panels as required to meet the specific mounting or connection requirements of different applications.

Referring more particularly to the drawings, 10 designates a honeycomb panel of any selected design. In essence, this panel 10 is formed by a pair of facing sheets 11 and 12 separated one from the other by a honeycomb core or filler 13.

For the purpose of connecting or mounting the panel 10 to another structure such as, for example, a supporting shelf or rib 14, a bushing 15 as proposed herein is illustrated. This bushing 15 comprises a centrally bored plug preferably formed or produced in two parts, viz., a hollow cylinder 16 of relatively rigid material at the center and an overlying and surrounding sleeve 17. The cylinder 16 defines a passage 18 for the shank of fastening means such as a bolt 19 by which the panel 10 is to be immovably connected to the structure 14.

The panel 10 is prepared to receive the bushing 15 by drilling or otherwise cutting it to produce a hole 20 therein that pierces one of the facing sheets 11 and the honeycomb core 13. This hole 20 has a diameter substantially equal to the external diameter of the bushing or plug 15 to snugly receive it when inserted. A concentric opening 21 substantially equal in diameter to the passage 18 is provided in the other facing sheet 12. The edge of the sheet 12 defining the hole 21 is recessed or dimpled as at 22 following known practice to produce a precision fit countersink for the head of the bolt 19 in the ultimate installation.

At one of its ends the cylinder 16 terminates in an outwardly projecting flange 23, the edge of which establishes the overall transverse dimension of the bushing 15 which is substantially equal to that of the hole 20 and is disposed in the plane of the outer surface of the sleeve 17. At its opposite end the cylinder 16 terminates in an angular edge 24 corresponding to so as to abut the inner surface of the dimple 22 when the bushing 15 is fully inserted in the hole 20. When so inserted, the length of the bushing 15 is such that the outer surface of the flange 23 is disposed in the plane of the outer surface of the facing sheet 11. At this time the end of the sleeve 17 adjacent the angular edge 24 abuts the inner surfaces of the dimple 22 and the facing sheet 12, this end surface of the sleeve 17 being angularly formed adjacent its inner and outer marginal edges, respectively.

Preferably, the sleeve 17 is fabricated of relatively lightweight material such as, for example, styrene foam, urethane foam, epoxy foam, or cellular cellulose acetate. If desired, the sleeve 17 and cylinder 16 may be secured to form a unitary structure, as for example, by an adhesive between their abutting surfaces. Moreover, when inserted in the panel 10, the bushing 15 is preferably similarly secured in place by an adhesive 25 between the abutting surfaces of the sleeve 17, the edge of the flange 23, and the adjacent surfaces of the honeycomb core 13 and facing sheets 11 and 12.

Where the facing sheet 11 is relatively thin, additional strength in shear may be obtained by dimpling as at 26 the marginal edge portion thereof adjacent the hole 20 and the provision of a projecting tapered lip 27 on the outer edge of the flange 23. The angle of the inner surface of the lip 27 is made to correspond to that of the outer surface of the dimple 26 for abutment therewith. The thickness of the flange 23 is substantially greater than that of the facing sheet 11 to create a shoulder 28 in contact with the edge surface of the sheet defining the hole 20.

From the foregoing it is manifest that when the panel 10 is located with respect to the supporting structure 14 so as to place the fastener passage 18 in registration with a hole 29 in the structure 14, the panel 10 is immovably secured by tightening the bolt 19. Such tightening of the bolt 19 forces its countersunk head against the dimpled surface 22 of the facing sheet 12 in opposition to its nut against the outer surface of the structure 14 in the conventional manner. This tightening is restricted by the rigid cylinder 16 which acts as a spacer to prevent the compression or buckling of the panel 10. At the same time, the edges of the facing sheets 11 and 12 defining the respective holes 20 and 21 are confined against movement relative to the honeycomb core 13 on the one hand by the abutting edge of the flange 23 and on the other hand by the shank of the bolt 19 as secured by the angled edge 24 of the cylinder 16 working in opposition to the head of the bolt 19. Thus, all subsequent shear loads imposed on the installed panel 10 are directed lineally of the facing sheets 11 and 12, and the honeycomb core 13 serves to resist the compressive loads only.

What is claimed is:

1. A bushing for a honeycomb panel comprising a centrally bored plug of fixed dimensions adapted for snug insertion in a hole substantially equal in diameter to the transverse dimension of said plug piercing one facing sheet and the honeycomb core of the panel, said plug having an axial fastener passage in registration with an opening in the other facing sheet of the panel and terminating at one end in a peripheral marginal edge having a shoulder disposed in the plane of the peripheral plug surface to abut the edge surface of said one facing sheet defining said hole when the end surface of said plug is disposed in the plane of the outer surface of said one facing sheet and terminating at its other end adjacent its outer marginal edge in an edge surface abutting the inner surface of said other facing sheet and adjacent its inner marginal edge in a relatively angular edge surface complementary to and for abutment with the inner surface of said other facing sheet when dimpled adjacent the opening aforesaid.

2. The bushing of claim 1 wherein said peripheral marginal edge includes a tapered lip extending laterally from said one end of the plug, the inner surface of said lip being angularly disposed corresponding to the marginal edge portion of the facing sheet defining said hole when dimpled and terminating at its base in the shoulder aforesaid.

3. The bushing of claim 1 wherein said plug comprises a rigid central cylinder terminating at one end in a flange in which said peripheral marginal edge is formed, and a sleeve of relatively light-weight material overlying and surrounding said cylinder in intimate contact with the outer surface thereof and the adjacent surface of said flange, the peripheral surface of said sleeve being disposed in the plane of said shoulder.

References Cited in the file of this patent
UNITED STATES PATENTS

| | | |
|---|---|---|
| 2,501,465 | Caramanoff | Mar. 21, 1950 |
| 2,957,196 | Kreider et al. | Oct. 25, 1960 |
| 2,961,760 | Horton et al. | Nov. 29, 1960 |
| 2,967,593 | Cushman | Jan. 10, 1961 |